H. AUSTIN.
APPLIANCE FOR BORING METALS OR OTHER HARD SUBSTANCES.
APPLICATION FILED NOV. 21, 1916.

1,226,164. Patented May 15, 1917.

Inventor:
Herbert Austin,
By
Attorney

UNITED STATES PATENT OFFICE.

HERBERT AUSTIN, OF BROMSGROVE, ENGLAND.

APPLIANCE FOR BORING METALS OR OTHER HARD SUBSTANCES.

1,226,164.       Specification of Letters Patent.      Patented May 15, 1917.

Application filed November 21, 1916. Serial No. 132,647.

*To all whom it may concern:*

Be it known that I, HERBERT AUSTIN, a subject of the King of Great Britain, and residing at Bromsgrove, in the county of Worcester, England, engineer, have invented certain new and useful Improvements in Appliances for Boring Metals or other Hard Substances, of which the following is a specification.

This invention has for its object an improved appliance for boring in metal or other hard substance a cavity which is required to vary in diameter, the more immediate purpose of the invention being for boring shells which are parallel inside for some distance and gradually curve to a smaller diameter toward the front end.

An appliance constructed according to this invention has a bar which directly carries the cutter, mounted, eccentrically of the axis of the interior of the article to be bored, in a holder which is adapted to travel endwise of the machine with which the appliance is used, and the bar is capable of a turning movement in relation to the holder. When the appliance is boring a parallel portion of a cavity or chamber, the bar is prevented from turning in relation to the holder, and the cutting edge of the cutter is consequently maintained at a constant distance from the axis of the cavity. In consequence of the axis of the bar being eccentric to the axis of the cavity, if the bar is turned in relation to the holder, the cutter is moved farther from or nearer to the axis of the cavity and bores to an enlarged or reduced diameter. A groove is formed in the surface of the bar and follows a course within such surface which adapts it to the special work required. A key which may be constituted as a roller engages with this groove and, except as hereinafter mentioned, is (or its axis is) stationary, and consequently as the bar moves forward it is prevented from turning, if the portion of the groove within which at the time the key engages is parallel with the bar, or it is turned if at the moment the key engages with a portion of the groove which is otherwise than parallel with the bar. If the appliance is required for use only in first boring parallel and then boring to a reducing or enlarging diameter, the parallel bore is effected by causing the key to first travel forward with the appliance, so that the groove does not move in relation to the key, and the groove is formed to run in a curved or slanting direction partially around the bar, and, on the tool reaching the point where the bore of reducing or enlarging diameter commences, the key is prevented from moving farther forward, with the result that the further movement forward of the bar, in relation to the key, causes the bar to turn.

In order that the invention may be clearly understood, I will now describe a convenient application of the same as applied, by way of example, to boring an explosive shell:—

Figure 1:
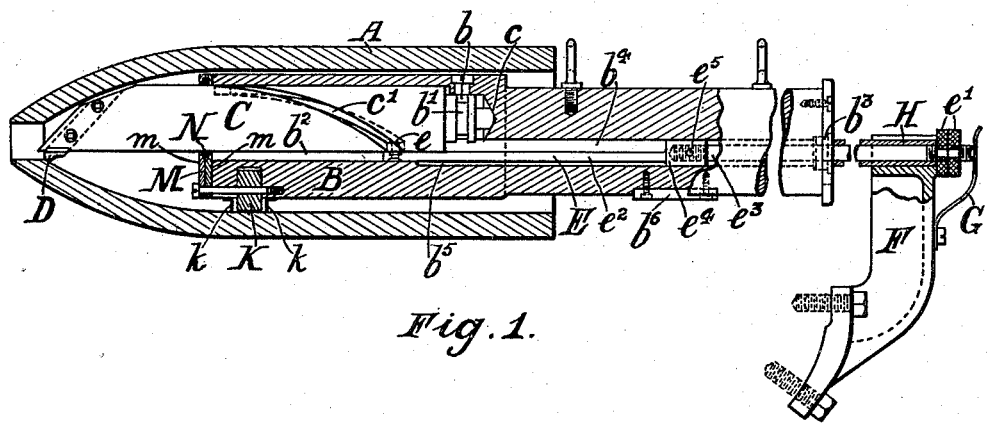
Figure 1 is a longitudinal section through the shell and through a considerable portion of the boring appliance, the remainder of which is shown in side elevation.
Figure 3:
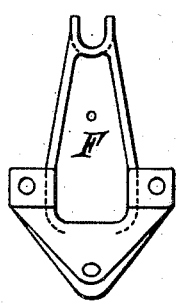
Fig. 3 is a view of the inner face of the bracket hereinafter described.
Figure 4:
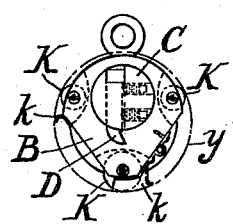
Fig. 4 is a front end view of the boring appliance, the interior surface of the shell being indicated by the broken circle $y$; and, Fig. 5 is a transverse section taken in the plane indicated by line 5—5 of Fig. 2.
Figure 5:
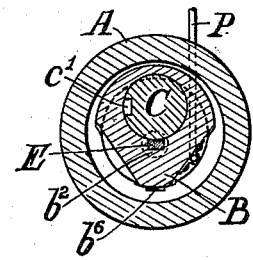
Figure 2:
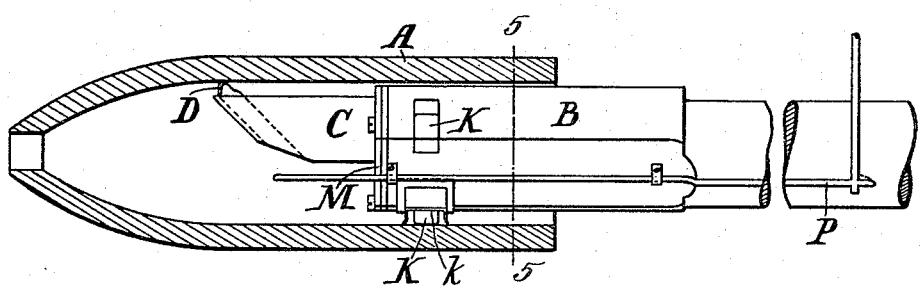
Fig. 2 is a similar view to Fig. 1 but shows the boring appliance entirely in elevation.

In Fig. 1, the cutter is shown in the position in which it is just completing the bore, and in Fig. 2 it is shown at the point where it is just passing from the parallel portion of the bore to the portion of gradually reducing diameter.

A is the shell which is being bored, B is a holder within which is fitted a cylindrical bar C which carries at its forward end the cutter D. The bar C is parallel with the holder B, but its axis is eccentric with the axis of the shell. The bar is capable of turning within the holder, but is prevented from moving endwise in relation to the holder by the engagement of a pin $b$ of the holder with an annular groove $b'$ which is turned in the rear end of the bar, and the backward thrust of the bar is taken by the pressure of a hardened steel conical surface $c$ thereof against a corresponding surface of the holder. A roller or key $e$ is carried by or formed with the forward end of a check-rod E which is slidable within a longitudinal groove $b^2$ of the holder B and along the surface of the bar C, and this roller or key enters a groove $c'$ which is formed within the surface of the bar C and runs partially therearound and at the same time endwise thereof, and on the rear end of this rod are a pair of lock nuts $e'$ which are shown, in Fig. 1, as against the rear face of a bracket F which is fixed to the bed (not shown) of the machine.

The rear end of the holder B is fixed within a headstock, or the like (not shown), which is slidable along the machine bed and is automatically moved therealong, such as by a leading-screw or other device, and the forward end of the holder enters within the parallel portion of the cavity which is being bored.

To commence the parallel cut, the headstock is moved back such distance in relation to the shell that the cutter D can commence the cut, and the roller or key $e$ is then within the forward end of the groove $c'$, the bar having been turned to such a degree that the cutter is then the required distance from the axis of the shell for boring the parallel portion of the cavity. Owing to the portion of the cavity within which the roller or key $e$ is then situated running mainly in an endwise direction, it prevents the bar C turning within the holder B and the check-rod E is carried forward with the holder and the cutter is maintained at a constant distance from the axis of the shell. When, however, the cutter has advanced to the point where the conoidal boring is to commence, the lock-nuts $e'$ are against the bracket F and the check-rod E cannot be carried farther forward. The farther advance of the holder then causes the groove $c'$ to travel forward in relation to the roller or key $e$, with the result that the bar C turns and gradually brings the tool D nearer to the axis of the shell. The groove $c'$ is, of course, shaped endwise to insure that the turning of the bar C will move the cutter nearer to the axis of the shell in such manner as will insure that, as the toolholder advances, the conoidal portion of the interior of the shell will be bored to the shape required.

G is a spring which is fixed at one end to the bracket F and at its free end bears against the rear end of the check-rod E. This spring will prevent the check-rod from moving substantially backward while the boring appliance is moved backward after boring a cavity, and therefore as the appliance is moved back, the bar will turn in relation to the holder B until the forward end of the groove $c'$ has come against the roller or key $e$, after which the spring G is turned sidewise clear of the check-rod E and the lock-nuts $e'$ and allows the boring appliance to be moved farther back, namely, into the position for commencing to bore the next shell.

H is a tube which surrounds the check-rod E between the holder B and the lock-nuts $e'$. When the appliance is moved back clear of the shell, a bush $b^3$ which is fixed in the back end of the holder B and through which the rod E is slidable, comes against the forward end of the tube H, whereby this tube gages the distance between the holder and the lock-nuts $e'$ and insures that, when the boring cut commences, the roller or key $e$ will be in proper position in relation to the bar C. The check-rod E is shown as formed in two portions, of which the forward portion $e^2$ is of a rectangular shape to slide within the groove $b^2$, except that its surface which is slidable along the bar C is slightly concave to suit the convexity of the surface of the bar, and of which the rear portion $e^3$ is round and is screwed into a socket $e^4$ which is formed on the rear end of the portion $e^2$. A grub-screw $e^5$, or the like, is used to prevent the accidental unscrewing of the portion $e^3$ within the socket $e^4$. The rod E is put into place from the back end of the holder B, and is first pushed forward until the roller or key $e$ is sufficiently forward of the forward end of the holder to allow the groove $c'$ of the bar C to be engaged therewith as the bar is being put into place, and, when this engagement has been effected, the bar C and the rod E are moved into their required positions. With a view to avoiding unnecessary length in the appliance, the cylindrical hole $b^4$, along with the socket $e^4$ is slidable, has one side $b^5$ thereof carried forward beyond the inner end of the opening in the holder which is to receive the bar C, whereby the socket $e^4$ may be moved somewhat into such opening in pushing the rod endwise prior to engaging the groove $c'$ with the roller or key $e$. $b^6$ is a key which is fixed at the underside of the rear end of the holder B, for the purpose of engaging with a keyway of the headstock or the like which carries the holder.

Three anti-friction rollers K are carried by the forward end of the holder B and just touch the interior surface of the portion of the shell which is bored parallel, thereby maintaining the holder from vibrating while the boring is taking place. Sheet metal or other suitable shields $k$ are carried by the holder B to prevent swarf getting in between the bored surface and the side roller toward which the underside of the article which is being bored turns upward and between such surface and the bottom roller; and to prevent swarf getting in between the bar C and the holder B, the portion of the bar C which projects through the front of the holder is surrounded by a cap M within a groove of which is inserted suitable packing N. The cap is conveniently formed of two plates $m$, and the packing is compressed within a groove which is formed partially in the inner edge of one plate and partially in the inner edge of the other plate, the plates being held against the end of the holder B, and tightened against one another, by means of the pins which secure the rollers K in place and around which they revolve. P indicates tubing for the purpose of lubrication.

If a cavity to be bored is of a different character to that shown in the drawings, the formation of the groove in the bar will, of course, be modified accordingly; and in many cases it will not be required that the key shall travel with the bar during any portion of a cutting operation. The character of the cavities which it may be required to bore may vary indefinitely and the details of construction will vary correspondingly, as will be obvious.

Having fully described my invention, what I claim and desire to secure by Letters Patent, is:—

1. A boring appliance for boring a cavity of varying diameter in metal or other hard substance, comprising an endwise traversable substantially cylindrical holder provided in its forward portion with a longitudinal tubular socket parallel with and eccentric to the axis of the cavity to be bored, a cutter bar turnable in said socket, projecting in front of said holder and carrying a cutter in its projecting portion, and means for automatically turning said cutter bar continuously within said socket while a cavity is being bored to a continually varying diameter to shift said cutter toward or from the axis of the cavity and change the diameter of traverse of said cutter.

2. The combination, in an appliance for boring in metal or other hard substance a length of cavity which is required to vary in diameter, of a holder which travels endwise, a bar carried by said holder eccentrically of the cavity to be bored and provided with a groove within said bar, a cutter carried by said bar, and a key which is carried by said holder and engages with said groove and is stationary in relation to the holder, and said groove being shaped to insure that its interaction with the key will turn the bar as required for variations in the diameter of said length of cavity.

3. The combination, in an appliance for boring metal or other hard substance in which a cavity to be bored is parallel for a portion of its length and varies in diameter for another portion of its length, of a holder which travels endwise, a bar carried by said holder eccentrically of the cavity to be bored and provided with a groove within such bar, a cutter carried by said bar, a rod which is slidable in relation to the holder, a key which is carried by said rod and engages with said groove, said rod and key traveling with said holder while the cutter is boring said parallel portion of the cavity, but arrested from traveling forward at a point where it is required that the bar shall commence to turn to control the position of the cutter in relation to the axis of the cavity for the purpose of further boring the cavity as required, said groove being of such shape as to insure that its interaction with the key, when the key is held stationary in relation to the holder, will turn the bar as required for variations in the diameter of the cavity.

4. The combination, in an appliance for boring metal or other hard substance in which a cavity to be bored is parallel for a portion of its length and varies in diameter for another portion of its length, of a holder which travels endwise, a bar carried by said holder eccentrically of the cavity to be bored, a cutter carried by said bar, means by which said bar may be turned in relation to said holder, and anti-friction rollers carried by said holder which just touch the parallel-bored surface of the cavity and steady the forward end of the holder while the boring operation is taking place.

5. The combination, in an appliance for boring metal or other hard substance in which a cavity to be bored is parallel for a portion of its length and varies in diameter for another portion of its length, of a holder which travels endwise, a bar carried by said holder eccentrically of the cavity to be bored and provided with a groove within such bar, a cutter carried by said bar, a rod which is slidable in relation to the holder, a key which is carried by said rod and engages with said groove, said rod and key traveling with said holder while the cutter is boring said parallel portion of the cavity, a shoulder of said rod which, when said holder has reached the point of its travel when the bore of varying diameter is to commence, is against a fixed abutment and arrests the travel of said rod, and said groove being of such shape as to insure that its interaction with the key, when the movement of the key has been arrested, will turn the bar as required for variations in the diameter of the cavity.

6. The combination, in an appliance for boring metal or other hard substance in which a cavity to be bored is parallel for a portion of its length and varies in diameter for another portion of its length, of a holder which travels endwise, a bar carried by said holder eccentrically of the cavity to be bored and provided with a groove within such bar, a cutter carried by said bar, a rod which is slidable in relation to the holder, a key which is carried by said rod and engages with said groove, said rod and key traveling with said holder while the cutter is boring said parallel portion of the cavity, a shoulder of said rod which, when said holder has reached the point of its travel when the bore of varying diameter is to commence, is against a fixed abutment and arrests the travel of said rod, said groove being of such shape as to insure that its interaction with the key, when the movement of the key has been arrested, will turn the bar as required for variations in the diameter of the cavity, and a movable abutment which may be brought behind the rod when in its forward position, to allow said holder and bar to be moved back in relation to the rod, for any required distance, and then be moved clear of the rod and allow the rod to move back with the holder and bar.

In witness whereof I have hereunto signed my name this 8th day of November, 1916, in the presence of two subscribing witnesses.

HERBERT AUSTIN.

Witnesses:
ERNEST PARKER,
KATHLEEN M. THOMPSON.

Copies of this patent may be obtained for five cents each, by addressing the "Commissioner of Patents, Washington, D. C."